(12) United States Patent
Barot et al.

(10) Patent No.: US 9,903,630 B2
(45) Date of Patent: *Feb. 27, 2018

(54) COOLING SYSTEMS AND METHODS

(71) Applicant: OxiCool Inc., Malvern, PA (US)

(72) Inventors: Ravikant T. Barot, Phoenixville, PA (US); Brandon K. Wilcox, Downingtown, PA (US)

(73) Assignee: OxiCool Inc., Malvern, PA (US)

( * ) Notice: Subject to any disclaimer, the term of this patent is extended or adjusted under 35 U.S.C. 154(b) by 647 days.

This patent is subject to a terminal disclaimer.

(21) Appl. No.: 14/204,920

(22) Filed: Mar. 11, 2014

(65) Prior Publication Data

US 2017/0051961 A1    Feb. 23, 2017

Related U.S. Application Data

(60) Provisional application No. 61/788,574, filed on Mar. 15, 2013.

(51) Int. Cl.
*F25B 15/00* (2006.01)
*F25B 49/04* (2006.01)
(Continued)

(52) U.S. Cl.
CPC ....... *F25B 49/046* (2013.01); *B60H 1/00378* (2013.01); *B60H 1/3201* (2013.01); *F25B 15/00* (2013.01); *F25B 17/08* (2013.01); *F25B 27/02* (2013.01); *F25B 49/04* (2013.01); *F25B 2400/01* (2013.01); *F25B 2500/06* (2013.01);
(Continued)

(58) Field of Classification Search
CPC .......... F25B 17/00; F25B 17/02; F25B 17/08; F25B 17/083; F25B 17/086; F25B 37/00; F25B 49/04; F25B 49/043
See application file for complete search history.

(56) References Cited

U.S. PATENT DOCUMENTS 3,828,566 A    8/1974   Wetzel
4,171,622 A   10/1979   Yamaguchi et al.
(Continued)

FOREIGN PATENT DOCUMENTS

WO    WO2016076947    5/2016

OTHER PUBLICATIONS

Office action for U.S. Appl. No. 14/681,526, dated Nov. 13, 2015, Barot et al., "Cooling Systems and Methods", 22 pages.
(Continued)

*Primary Examiner* — Orlando E Aviles Bosques
(74) *Attorney, Agent, or Firm* — Lee & Hayes, PLLC

(57) ABSTRACT

A method of operating a cooling system that has at least one evaporator containing a refrigerant and at least one adsorbent chamber containing adsorbent configured to provide adsorption of vaporized refrigerant from the at least one evaporator in a cooling mode and provide desorption of the refrigerant to the at least one evaporator in a recharging mode, the method including; controlling the adsorption and desorption of the refrigerant of the at least one adsorbent chamber between the cooling modes and recharging modes during a cooling cycle; ceasing desorption of the refrigerant from the at least one adsorbent chamber; allowing adsorption of the vaporized refrigerant from the at least one evaporator; and maintaining the at least one adsorbent chamber in an adsorbed state at the end of the cooling cycle in a storage mode.

20 Claims, 6 Drawing Sheets

(51) Int. Cl.
    *F25B 17/08* (2006.01)
    *F25B 27/02* (2006.01)
    *B60H 1/00* (2006.01)
    *B60H 1/32* (2006.01)

(52) U.S. Cl.
    CPC ... *F25B 2500/31* (2013.01); *F25B 2600/2515* (2013.01); *F25B 2700/2106* (2013.01)

(56) References Cited

U.S. PATENT DOCUMENTS

| | | |
|---|---|---|
| 5,477,706 A | 12/1995 | Kirol et al. |
| 5,526,648 A | 6/1996 | Wertenbach et al. |
| 5,813,248 A | 9/1998 | Zornes et al. |
| 5,901,780 A | 5/1999 | Zeigler et al. |
| 5,934,369 A | 8/1999 | Dosani et al. |
| 7,836,723 B2 | 11/2010 | Kaufman et al. |
| 9,441,868 B1 | 9/2016 | Barot et al. |
| 2010/0043462 A1 | 2/2010 | Barot et al. |
| 2014/0047853 A1 | 2/2014 | Zhong et al. |
| 2014/0250927 A1 | 9/2014 | Yoshida et al. |
| 2016/0290696 A1 | 10/2016 | Barot et al. |
| 2016/0327325 A1 | 11/2016 | Barot et al. |

OTHER PUBLICATIONS

PCT Search Report and Written Opinion dated Feb. 9, 2017 for PCT Application No. PCT/US16/37328, 11 pages.
Office action for U.S. Appl. No. 15/181,470, dated Oct. 18, 2016, Barot et al., "Cooling System", 11 pages.
Office action for U.S. Appl. No. 15/136,484, dated Nov. 16, 2016, Barot et al., "Cooling Systems and Methods", 18 pages.

COOLING SYSTEMS AND METHODS

CROSS-REFERENCE TO RELATED APPLICATIONS

This application claims the benefit of U.S. Provisional Patent Application No. 61/788,574 filed Mar. 15, 2013 entitled "Cooling Systems and Methods", which is incorporated by reference herein in its entirety.

FIELD OF THE INVENTION

The present invention generally relates to cooling systems and methods and, in some embodiments, systems and methods for storing (e.g., winterizing) and recharging adsorption cooling systems.

BACKGROUND OF THE INVENTION

Adsorption cooling systems using water as a refrigerant have been developed for air conditioning and other cooling systems. Examples of adsorption cooling systems are shown and described in U.S. Patent Application Publication No. 2010/0043462, U.S. Pat. No. 7,836,723, and U.S. Pat. No. 5,813,248, which are hereby incorporated by reference in their entirety.

BRIEF SUMMARY OF THE INVENTION

In one embodiment there is a cooling system comprising: at least one evaporator containing a refrigerant; at least one adsorbent chamber fluidly coupled to the at least one evaporator and containing adsorbent configured to provide adsorption of vaporized refrigerant from the at least one evaporator in a cooling mode and configured to provide desorption of the refrigerant to the at least one evaporator in a recharging mode; and a control system configured to control the adsorption and desorption of the refrigerant of the at least one adsorbent chamber between the cooling modes and recharging modes during a cooling cycle, wherein at the end of the cooling cycle the control system is programmed to cease desorption of the refrigerant from the at least one adsorbent chamber, allow adsorption of the vaporized refrigerant from the at least one evaporator and at the end of the adsorption cycle continue to maintain the at least one adsorbent chamber in an adsorbed state in a storage mode.

In one embodiment there is a cooling system comprising: at least one evaporator containing a refrigerant; at least two adsorbent chambers fluidly coupled to the at least one evaporator and each containing adsorbent configured to provide adsorption of vaporized refrigerant from the at least one evaporator in a cooling mode and configured to provide desorption of the refrigerant to the at least one evaporator in a recharging mode; and a control system configured to control the adsorption and desorption of the refrigerant of the at least two adsorbent chambers, the control system being programmed to alternate the at least two adsorbent chambers between the cooling modes and recharging modes to maintain substantially continuous adsorption of the vaporized refrigerant from the at least one evaporator during a cooling cycle, wherein at the end of the cooling cycle the control system is programmed to cease desorption of the refrigerant from the at least two adsorbent chambers, allow adsorption of the vaporized refrigerant from the at least one evaporator and at the end of the adsorption cycle continue to maintain the at least two adsorbent chambers in an adsorbed state in a storage mode.

In one embodiment, the cooling system further comprises a plurality of valves disposed between the at least one evaporator and the at least two adsorbent chambers, the plurality of valves being controlled by the control system. In one embodiment, the control system is programmed to open the plurality of valves in the storage mode. In one embodiment the system further comprises a condenser fluidly coupled to the at least two adsorbent chambers; and a water reservoir fluidly coupled between the condenser and the at least one evaporator, wherein the at least one evaporator includes a single evaporator. In one embodiment, the refrigerant is moved within the system only as a result of the adsorption in and desorption from the adsorbent and phase changes of the refrigerant. In one embodiment, the refrigerant is water. In one embodiment, the adsorbent is zeolite. In one embodiment, the adsorbent is a material having a metal organic framework. In one embodiment, the control system is programmable to automatically enter the storage mode at the end of the cooling cycle.

In one embodiment the cooling system further comprises an ambient air temperature sensor, wherein the control system is programmed to automatically enter the storage mode when the temperature sensor senses a predetermined ambient air temperature. In one embodiment, the control system is programmed to automatically enter into the recharging modes when the ambient air reaches a second predetermined ambient air temperature. In one embodiment, the control system is remotely programmable to enter the storage mode. In one embodiment, the cooling system further comprises at least one heat exchanger thermally coupled to the at least one evaporator and configured to exchange heat between a heat transfer medium and the at least one evaporator. In one embodiment, the cooling system further comprises at least one energy source thermally coupled to the at least two adsorbent chambers and configured to heat the at least two adsorbent chambers during the recharging modes. In one embodiment, the at least one energy source includes exhaust from an engine of a vehicle. In one embodiment, the at least one energy source includes at least one heater, each heater thermally coupled to at least one of the at least two adsorbent chambers, the control system being programmed to use the at least one heater to heat the at least two adsorbent chambers during the recharging modes of the cooling cycle, the control system being programmable to at least partially use the heat from the engine exhaust to heat the at least two adsorbent chambers causing desorption of the refrigerant from the adsorbent.

In one embodiment, substantially all of the refrigerant is adsorbed within the adsorbent in the storage mode. In one embodiment, a volume of the refrigerant is substantially equal to or less than a total adsorption capacity of the adsorbent. In one embodiment, the evaporator includes a thermally conductive liner. In one embodiment, there is a method of operating a cooling system having at least one evaporator containing a refrigerant and at least one adsorbent chamber containing adsorbent configured to provide adsorption of vaporized refrigerant from the at least one evaporator in a cooling mode and provide desorption of the refrigerant to the at least one evaporator in a recharging mode, the method comprising: controlling the adsorption and desorption of the refrigerant of the at least one adsorbent chamber between the cooling modes and recharging modes during a cooling cycle; ceasing desorption of the refrigerant from the at least one adsorbent chamber; allowing adsorption of the vaporized refrigerant from the at least one evaporator; and maintaining the at least one adsorbent chamber in an adsorbed state at the end of the cooling cycle in a storage mode.

In one embodiment, the method further comprises using exhaust heat from an engine of a vehicle to heat the at least one adsorbent chamber and cause desorption of the refrigerant from the adsorbent following the storage mode and before a subsequent cooling cycle. In one embodiment, the method further comprises automatically entering the storage mode when a temperature sensor senses a predetermined ambient air temperature. In one embodiment, the cooling system includes at least two adsorbent chambers and further comprising: controlling the adsorption and desorption of the refrigerant of the at least two adsorbent chambers between the cooling modes and recharging modes to maintain substantially continuous adsorption of the vaporized refrigerant from the at least one evaporator during a cooling cycle. In one embodiment, during the storage mode, the ambient temperature of the air is about or below the freezing point of the refrigerant. In one embodiment, substantially all of the refrigerant is adsorbed within the adsorbent in the storage mode.

BRIEF DESCRIPTION OF THE SEVERAL VIEWS OF THE DRAWINGS

The following detailed description of embodiments of the cooling systems and methods will be better understood when read in conjunction with the appended drawings of exemplary embodiments. It should be understood, however, that the invention is not limited to the precise arrangements and instrumentalities shown.

In the drawings.

DETAILED DESCRIPTION OF THE INVENTION

Figure 1:
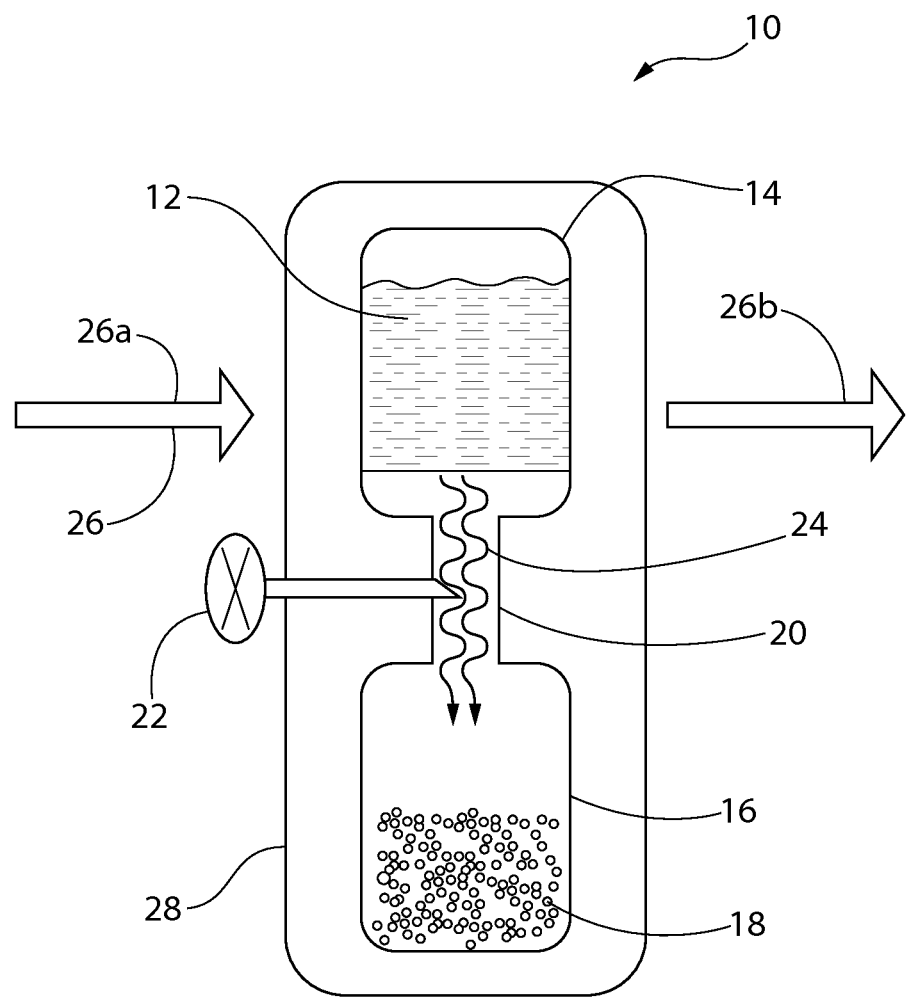
FIG. 1 is a side cross sectional view of a cooling system in accordance with an exemplary embodiment of the present invention.
Figure 2:
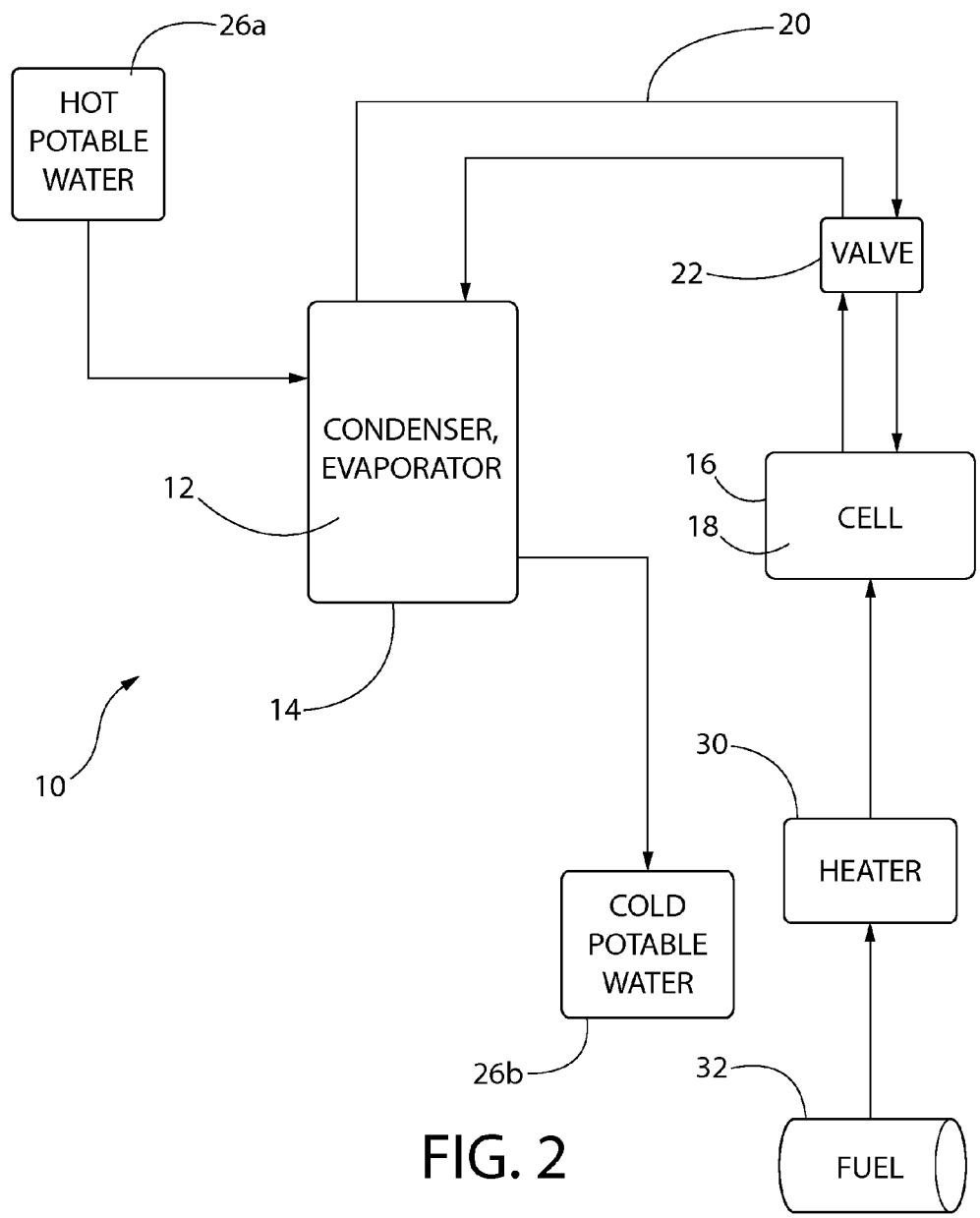
FIG. 2 is a schematic diagram of the cooling system shown in FIG. 1.
Figure 3:
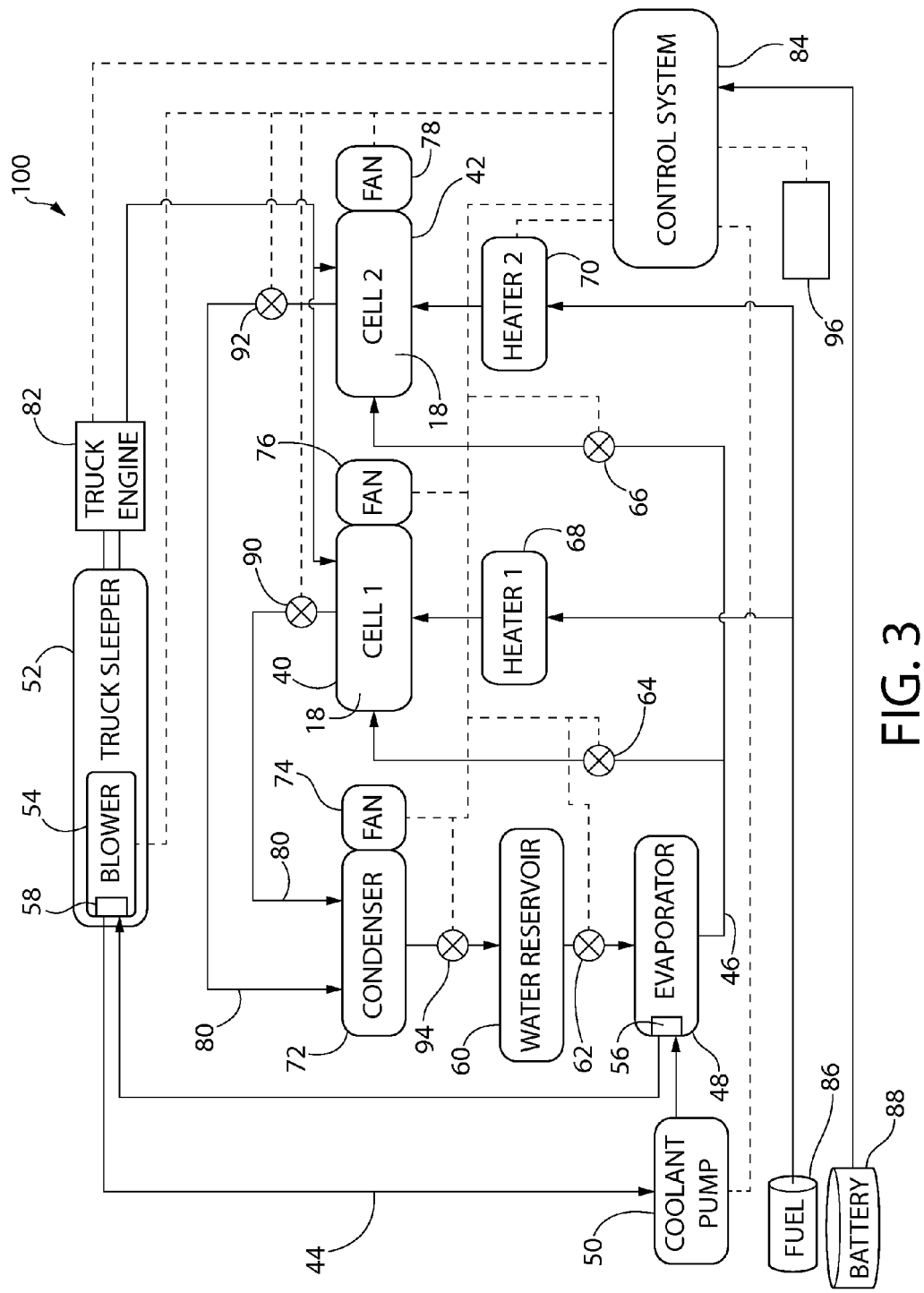
FIG. 3 is a schematic diagram of a cooling system in accordance with another exemplary embodiment of the present invention.

Referring to the drawings in detail, there is shown in FIGS. 1-3 cooling systems, generally designated 10 and 100, in accordance with exemplary embodiments of the present invention. Exemplary uses of cooling systems 10, 100 include air conditioning for homes, buildings and vehicles, potable liquid cooling systems (e.g., portable military or hiking water systems), on demand cooling for beverage dispensing systems (e.g., water, sports drinks, beer), industrial and environmental applications (e.g., cooling exhaust temperature of an incinerator), and military and athletic uniforms and protective apparel.

Referring to FIGS. 1 and 2, cooling system 10 includes a refrigerant 12 contained within a refrigerant chamber 14. In one embodiment, refrigerant chamber 14 is fluidly coupled to an adsorbent chamber 16 containing an adsorbent 18. Refrigerant chamber 14 is fluidly coupled to adsorbent chamber 16 via a fluid passageway 20 such as a pipe or conduit. In one embodiment, fluid passageway 20 includes one or more valves 22 that control the fluid coupling between refrigerant chamber 14 and adsorbent chamber 16. In one embodiment, refrigerant chamber 14 and adsorbent chamber 16 are contained within a common housing 28. In other embodiments, housing 28 includes two or more parts. In one embodiment, refrigerant 12 is hermetically sealed within cooling system 10. In one embodiment, adsorbent 18 is a material configured to adsorb and desorb refrigerant 12. In one embodiment, adsorbent 18 is configured to provide adsorption of vaporized refrigerant 24 from refrigerant chamber 14 in a cooling mode (illustrated in FIG. 1) and configured to provide desorption of refrigerant 12 back into refrigerant chamber 14 in a recharging mode. During the cooling mode, a heat transfer medium or media 26 is passed over, around and/or through refrigerant chamber 14 to form a heat exchanger coupling between heat transfer medium 26 and refrigerant chamber 14.

Heat transfer medium 26 may be any suitable media to be cooled or used to cool another medium. Heat transfer medium 26 may be the space or media to be cooled directly (e.g., heat transfer medium 26 in FIGS. 1 and 2 is the water to be consumed). In other embodiments, heat transfer medium 26 may be used to extend the heat exchange with refrigerant chamber 14 to another area (e.g., a living room or sleeping space, see FIG. 3) or media. In one embodiment, heat transfer medium 26 is air. In one embodiment, heat transfer medium 26 is water. In one embodiment, heat transfer medium 26 includes glycol mixtures or other antifreeze agents.

As vaporized refrigerant 24 moves from refrigerant chamber 14 into adsorbent chamber 16, the pressure within refrigerant chamber 14 decreases reducing the boiling point of refrigerant 12 and causing it to evaporate, thereby decreasing the temperature of refrigerant chamber 14 and pulling heat from heat transfer medium 26 such that exiting heat transfer medium 26$b$ is at a lower temperature than entering heat transfer medium 26$a$. In order to reset or recharge cooling system 10 and be ready for a subsequent cooling cycle, energy is applied to adsorbent chamber 16 to cause the adsorbed refrigerant 12 to desorb from adsorbent 18 and back into refrigerant chamber 14. In one embodiment, a heater 30 having a fuel source 32 is used to apply heat to adsorbent 18 in the recharging mode.

Refrigerant 12 may be cycled in a closed loop between the cooling and recharging modes. In one embodiment, refrigerant 12 is water. In one embodiment, refrigerant 12 is pure water. In one embodiment, refrigerant 12 is substantially pure water. In one embodiment, refrigerant 12 is water containing no additives. In other systems, water containing adjuvants may be desired as refrigerant 12. One example of useful adjuvants is an anti-microbial (e.g., bacteriocidal or fungicidal) composition. In some embodiments, it is preferred that refrigerant 12 does not contain materials which would interfere with operation of cooling system 10 in its normal operation. Thus, in some embodiments, glycols and other antifreeze agents are generally to be excluded from refrigerant 12, at least in amounts effective for storing cooling system 10 in ambient conditions around or below the freezing point of refrigerant 12.

In one embodiment, adsorbent 18 exhibits a high ability to adsorb refrigerant 12 and to remain in an adsorbed state over practical lengths of time, while maintaining physical and physicochemical form and function. Such materials may be useful when they exhibit a high ability to adsorb water, efficient and effectively reversible desorption of water upon application of heat energy, and physical and physicochemical stability during and following repeated adsorption and desorption cycles.

In one embodiment, adsorbent 18 includes a desiccant material. In one embodiment, adsorbent 18 is a desiccant. In one embodiment, adsorbent 18 is zeolite. A zeolite may be described as, but without limitation, hydrous aluminum silicate in porous granules. Exemplary zeolites that may be used include analxime, chabazite, heulandite, natrolite, phillipsite and stilbite. In one embodiment, adsorbent 18 is any drying agent that maintains its physical structure when substantially fully contacted with water. In other embodiments, adsorbent 18 is any adsorptive and/or absorptive material including but not limited to diatomaceous earth, activated alumina, silica gel, calcium aluminosilicate clay, molecular sieves (e.g., electrically charged molecular sieves), metal organic framework materials, activated carbon, and/or lithium chloride. In other embodiments, adsorbent 18 may be an electrically chargeable and dischargeable material (e.g., a porous slab or particles of material such as a metal including aluminum, stainless steel and alloys thereof) such that electrical energy is used to control the electrical charge of the pores of the material to adsorb and desorb refrigerant 12 from adsorbent 18.

A difficulty in water based adsorption cooling systems is the danger from freezing of refrigerant 12 if exposed to cold ambient conditions. Should freezing of refrigerant 12 within cooling system 10 occur, split piping and/or damaged valves, seals, reservoirs and other components of cooling system 10 could result causing cooling system 10 breakdown and possibly other ancillary damage. To avoid these concerns, cooling system 10 is winterized (e.g., safely stored for the duration of a winter season or an otherwise cold period) by keeping refrigerant 12 adsorbed within adsorbent 18. In one embodiment, refrigerant 12 is adsorbed within adsorbent 18 prior to any freezing of refrigerant 12. Refrigerant 12 may be adsorbed within adsorbent 18 to place cooling system 10 into a storage mode for any reason unrelated or in addition to freezing concerns.

Refrigerant 12 may, in certain embodiments, be sealed within cooling system 10 such that draining of refrigerant 12 from cooling system 10 is impractical or undesirable. Thus, were such closed cooling systems 10 exposed to low temperatures, freezing of refrigerant 12 may occur leading to expansive damage to cooling system 10. In certain embodiments, the mass of refrigerant 12 stored within adsorbent 18 in the storage mode does not freeze regardless of the ambient conditions since refrigerant 12 is stored as individual molecules within the nano structure of adsorbent 18. In such embodiments, refrigerant 12 within cooling system 10 in the storage mode is incapable of freezing in the storage mode regardless of the ambient conditions.

In other embodiments, such as with absorptive materials as adsorbent 18 for example, refrigerant 12 stored within adsorbent 18 may become cold and may chill substantially below the standard freezing point of water before freezing or partially freezing. In use, when refrigerant 12 is stored within adsorbent 18, refrigerant 12 and the masses of adsorbent 18 it is stored within does not expand as desorbed water begins to around 4° Celsius. Storing refrigerant 12 within adsorbent 18 during the storage mode reduces or avoids the damage to cooling system 10 that might otherwise result should desorbed refrigerant 12 expand upon freezing. Cooling system 10 may therefore be safely stored in the storage mode and subject to ambient conditions that would otherwise freeze refrigerant 12 without having to drain refrigerant 12 from cooling system 10.

It will be appreciated that in the normal operation of cooling system 10 employing adsorptive cycles, refrigerant 12 is repeatedly adsorbed and desorbed in adsorbent chamber 18. In one embodiment, the present invention permits such systems containing refrigerant 12 to be exposed to conditions under which refrigerant 12 would normally freeze, with refrigerant 12 in place. In some embodiments, cooling system 10 is recharged when winterization is no longer desired or required by desorbing refrigerant 12 from adsorbent 18. In one embodiment, adsorption of refrigerant 12 is controlled through the use of valve 22. In one embodiment, desorption of refrigerant 12 is controlled by the application of external heat to adsorbent chamber 16. In one embodiment, cooling system 10 is manually entered into the storage mode. In other embodiments, a control system 10 automatically enters cooling system 10 into the storage mode.

In one embodiment, a method of operating cooling system 10 having at least one evaporator or refrigerant chamber 14 containing refrigerant 12 and at least one adsorbent chamber 16 containing adsorbent 18 configured to provide adsorption of vaporized refrigerant 24 from the at least one evaporator 14 in a cooling mode and provide desorption of refrigerant 12 to the at least one evaporator 14 in a recharging mode, the method includes: controlling the adsorption and desorption of refrigerant 12 of the at least one adsorbent chamber 16 between the cooling modes and recharging modes during a cooling cycle, ceasing desorption of refrigerant 12 from the at least one adsorbent chamber 16, allowing adsorption of vaporized refrigerant 24 from the at least one evaporator 14, and maintaining the at least one adsorbent chamber 16 in an adsorbed state at the end of the cooling cycle in a storage mode.

Cooling system 10 may be put into and kept in the storage mode, for example, when the temperature of the ambient air is about or below the freezing point of desorbed refrigerant 12. In one embodiment, the temperature of the ambient air during the storage mode is approximately 4° Celsius or lower. In one embodiment, valve 22 is opened to place cooling system 10 in the storage mode. In one embodiment, after the adsorbent chamber 16 is fully adsorbed, no heat is applied to adsorbent chamber 16 thereby keeping adsorbent chamber 16 and the cooling system 10 in the storage mode. In one embodiment, cooling system 10 is automatically put into the storage mode at the end of the cooling cycle regardless of the ambient temperature in the event the temperature of the ambient air unexpectedly drops to about or below the freezing point of refrigerant 12. For example, if cooling system 10 is used during the day to keep drinking water cool, temperatures may drop expectedly or unexpectedly overnight when cooling system 10 is not in use. Also, if cooling system 10 is used periodically, it may be days or months before the next cooling cycle and it may not be known if the temperature of the ambient air will drop to about or below the freezing point of refrigerant 12. In mobile applications, cooling system 10 may be moved to or pass through a cold environment (e.g., in a truck driving from a warm coastal area through a cold mountainous area or a truck driving into a refrigerated storage building). In some embodiments, by keeping cooling system 10 in the storage mode after each cooling cycle, no action is required if the temperature of the ambient drops to about or below the freezing point of refrigerant 12 whether or not the temperature change was expected.

User may place cooling system 10 into the storage mode by adsorbing refrigerant 12 into adsorbent 18 before refrigerant 12 can freeze. In one embodiment, a user places cooling system 10 into the storage mode manually by leaving valve 22 open, or leaving valve 22 open for a period of time at least long enough for adsorbent 18 to adsorb substantially all of refrigerant 12, and then ceasing to apply heat to adsorbent chamber 16 to desorb refrigerant 12 from adsorbent 18 such that refrigerant 12 remains in adsorbent 18. In other embodiments, cooling system 10 automatically or semi automatically enters into the storage mode with the use of an electronic control (see cooling system 100 below). In one embodiment, cooling system 10 includes a temperature sensor that is coupled to a control system configured to automatically enter the storage mode when the sensor senses a predetermined ambient air temperature (e.g., at or below the freezing temperature of refrigerant 12). In one embodiment cooling system 10 is configured to automatically end the storage mode and desorb refrigerant 12 from adsorbent chamber 16 when the temperature sensor senses a predetermined ambient air temperature (e.g., above the freezing temperature of refrigerant 12) or when cooling system 10 is turned on. In one embodiment, the control system is configured to control valve 22 to control the adsorption of refrigerant 12 into refrigerant chamber 14. In one embodiment, the control system is configured to control the heat source to control the desorption of refrigerant 12 from refrigerant chamber 14.

In one embodiment, a total volume of refrigerant 12 in liquid form is substantially equal to or less than a total adsorption capacity of adsorbent 18. In one embodiment, substantially all of refrigerant 12 is adsorbed within adsorbent 18 in the storage mode. In one embodiment, approximately 50% of refrigerant 12 is adsorbed within adsorbent 18 in the storage mode. In one embodiment, approximately 60% of refrigerant 12 is adsorbed within adsorbent 18 in the storage mode. In one embodiment, approximately 70% of refrigerant 12 is adsorbed within adsorbent 18 in the storage mode. In one embodiment, approximately 80% of refrigerant 12 is adsorbed within adsorbent 18 in the storage mode. In one embodiment, approximately 85% of refrigerant 12 is adsorbed within adsorbent 18 in the storage mode. In one embodiment, approximately 90% of refrigerant 12 is adsorbed within adsorbent 18 in the storage mode. In one embodiment, approximately 95% of refrigerant 12 is adsorbed within adsorbent 18 in the storage mode. In one embodiment, approximately 96% of refrigerant 12 is adsorbed within adsorbent 18 in the storage mode. In one embodiment, approximately 97% of refrigerant 12 is adsorbed within adsorbent 18 in the storage mode. In one embodiment, approximately 98% of refrigerant 12 is adsorbed within adsorbent 18 in the storage mode. In one embodiment, approximately 99% of refrigerant 12 is adsorbed within adsorbent 18 in the storage mode. In one embodiment, approximately 99.5% of refrigerant 12 is adsorbed within adsorbent 18 in the storage mode. In one embodiment, approximately 99.6% of refrigerant 12 is adsorbed within adsorbent 18 in the storage mode. In one embodiment, approximately 100% of refrigerant 12 is adsorbed within adsorbent 18 in the storage mode. In one embodiment, 100% of refrigerant 12 is adsorbed within adsorbent 18 in the storage mode.

Referring to FIG. 3, in one exemplary embodiment, cooling system 100 is a substantially continuous cooling system. In one embodiment, cooling system 100 is a system used to cool a sleeping or passenger compartment 52 of a truck while a driver sleeps as illustrated. However, cooling system 100 may be configured to cool any desirable space or media.

Cooling system 100 may provide continuous cooling by including two or more adsorbent chambers 40, 42 that alternate between the cooling modes and recharging modes to maintain substantially continuous adsorption of the vaporized refrigerant 46 from the at least one evaporator 48 during a cooling cycle. In one embodiment, a cooling cycle is continued so long as at least one adsorbent chamber 40, 42 is adsorbing refrigerant 46 from evaporator 48. In one embodiment, heat transfer medium 44 is coupled to evaporator 48 via a first heat exchanger 56. In one embodiment, evaporator 48 absorbs heat from heat transfer medium 44 via first heat exchanger 56 and substantially maintains heat transfer medium 44 below a desired temperature during the cooling cycle.

In one embodiment, heat transfer medium 44 is used to cool a desired space such as a space 52 through a second heat exchanger 58. In one embodiment, space 52 is generally enclosed. In one embodiment, space 52 is a room such as a sleeper compartment or passenger compartment of a vehicle or a room of a house, or a liquid such as drinking water or beer. In one embodiment, heat transfer medium 44 is moved between the first and second heat exchangers 56, 58 by a pump 50. In one embodiment, the second heat exchanger 58 includes a fan 54. In one embodiment, fan 54 helps to distribute cooled air within space 52.

In one embodiment, cooling system 100 includes a reservoir 60. In one embodiment, reservoir 60 is configured to contain refrigerant 12 in liquid form. In one embodiment, reservoir 60 is fluidly coupled to evaporator 48. In one embodiment, a valve 62 is disposed within and configured to control the fluid coupling between evaporator 48 and reservoir 60. In one embodiment, evaporator 48 is fluidly coupled to first adsorbent chamber 40. In one embodiment, a valve 64 is disposed within and configured to control the fluid coupling between evaporator 48 and first adsorbent chamber 40. In one embodiment, evaporator 48 is fluidly coupled to second adsorbent chamber 42. In one embodiment a valve 66 is disposed within and configured to control the fluid coupling between evaporator 48 and second adsorbent chamber 42. In one embodiment, a single evaporator 48 is fluidly coupled to two or more adsorbent chambers 40, 42. In other embodiments, additional adsorbent chambers and evaporators may be provided in various configurations. In one embodiment, condenser 72 is omitted. In other embodiments, condenser 72, water reservoir 60 and evaporator 48 are combined into a single device (see FIGS. 1 and 2).

Figure 5:
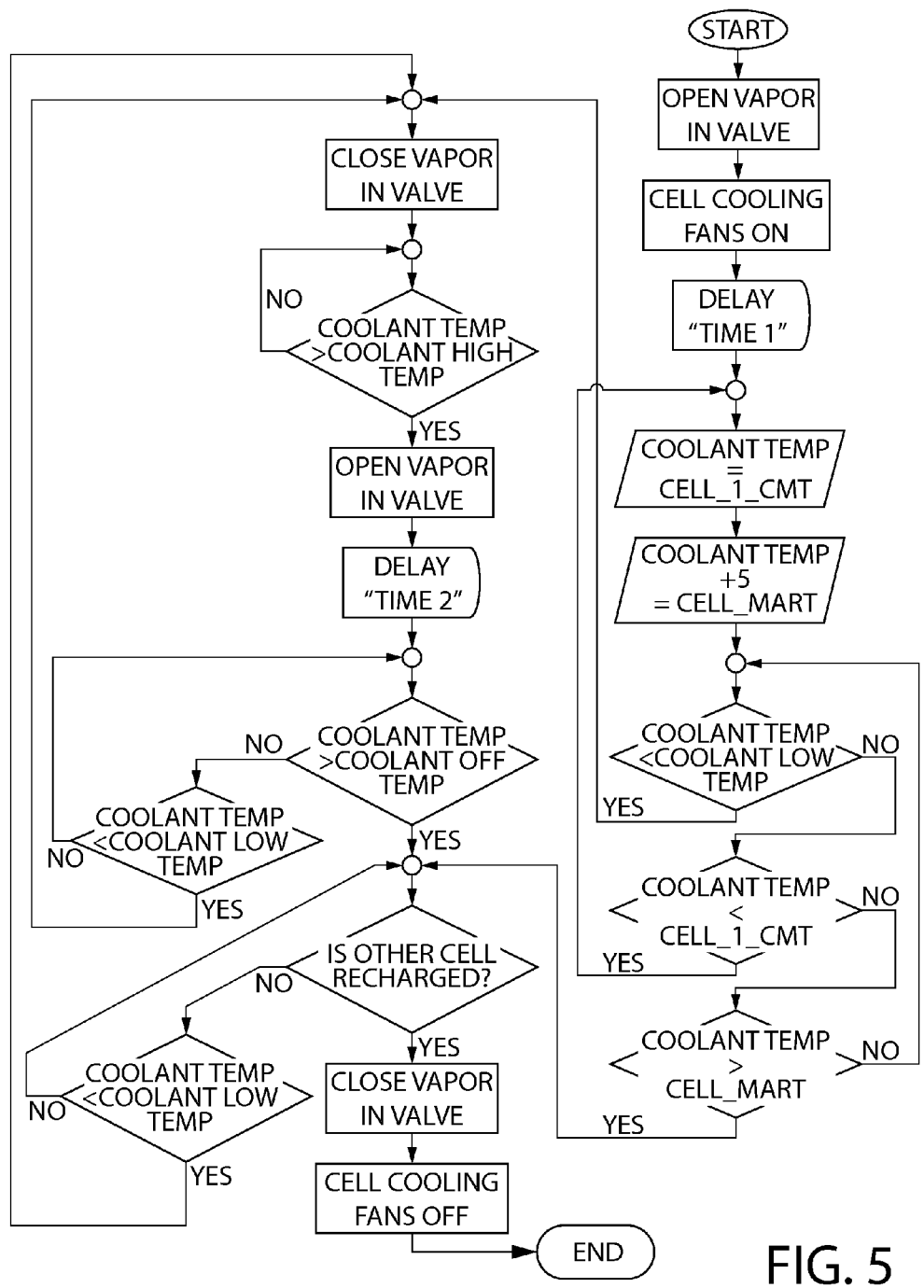
FIG. 5 is a flow chart of the operation of a cooling system in accordance with an exemplary embodiment of the present invention.

Referring to FIG. 5, because heat transfer medium 44 may eventually reach a temperature (e.g., approximately 50° F.) where refrigerant 12 in evaporator 48 begins to freeze potentially damaging the structural integrity (e.g., a hermetic seal) of evaporator 48, a temperature sensor may be provided within heat transfer medium 44 and/or evaporator 48 and one or more valves 62, 64, 66 may be closed or partially closed to slow or stop adsorption into adsorbent 18 and further cool refrigerant 12 based on the sensed temperature. In other embodiments, one or more valves 62, 64, 66 are opened to reduce the temperature of evaporator 48 if heat transfer medium 44 exceeds a certain predetermined temperature. In one embodiment, valves 62, 64, 66 are binary. In other embodiments, valves 62, 64, 66 are adjustable to different amounts of openness between ON and OFF. In one embodiment, control system 84 controls valves 62, 64, 66. In one embodiment, control system 84 controls valves 62, 64, 66 to maintain heat transfer medium 44 between a predetermined temperature range (e.g., approximately 52.5° F. to approximately 53.0° F.).

In some applications, it may be desirable to have evaporator go to lower than the approximate freezing temperature of refrigerant 12 (e.g., below 0° C.). In such instances, rather than keeping a particular quantity of refrigerant 12 in evaporator 48 at all times, only the quantity required to be adsorbed into adsorbent 18 (e.g., a spray at a time) is fed into evaporator 48. In one embodiment, valve 62 controls the amount of refrigerant 12 introduced into evaporator 48. In one embodiment, valve 62 is controlled to feed refrigerant 12 into evaporator 48 at the approximately at the same rate refrigerant 12 is leaving evaporator 48. In other embodiments, an injector, such as a sprayer, is used inject refrigerant 12 into evaporator 48. Controlling the amount of refrigerant 12 entering evaporator 48 may allow evaporator 48 to go to lower than the freezing temperature of refrigerant 12 with reduced or no risk of freezing damage because the quantity of refrigerant 12 introduced into evaporator 48 at any given time is too low to cause damage.

In other embodiments, evaporator 48 may have a high thermal conductivity. For example, evaporator 48 may include a liner that is thermally conductive. Providing an evaporator 48 with a high thermal conductivity may help to more quickly transfer heat from the outside of evaporator 48 to the inside of evaporator 48 to melt or prevent ice droplets from forming on the inside of evaporator 48.

In one embodiment, first adsorbent chamber 40 is fluidly coupled to a condenser 72. In one embodiment, second adsorbent chamber 40 is fluidly coupled to condenser 72. In one embodiment, condenser 72 includes a fan 74 configured to cool vaporized refrigerant 80 exiting first and second adsorbent chambers 40, 42. In one embodiment, air is used to cool condenser 72. In other embodiments, water or another liquid is used to cool condenser 72. In one embodiment, condenser 72 is fluidly coupled to reservoir 60. In one embodiment, condensed refrigerant 12 is transferred from condenser 72 into reservoir 60. In one embodiment, a valve 94 is disposed within and configured to control the fluid coupling between condenser 72 and water reservoir 60. In one embodiment, a single condenser 72 is provided for two or more adsorbent chambers 40, 42. In other embodiments, each adsorbent chamber 40, 42 is fluidly coupled to its own condenser 72.

In one embodiment, a first heater 68 is thermally coupled to first adsorbent chamber 40. In one embodiment, first heater 68 is configured to heat first adsorbent chamber 40 to a sufficient temperature to cause refrigerant within adsorbent 18 of first adsorbent chamber 40 to desorb from adsorbent 18 in the recharging mode. In one embodiment, first adsorbent chamber 40 is thermally coupled to a fan 76 configured to cool first adsorbent chamber 40 following the desorbing or recharging mode and prior and/or during an adsorbing or cooling mode. In one embodiment, a second heater 70 is thermally coupled to second adsorbent chamber 42. In one embodiment, second heater 70 is configured to heat second adsorbent chamber 42 to a sufficient temperature to cause refrigerant within adsorbent 18 of second adsorbent chamber 42 to desorb from adsorbent 18 in the recharging mode. In one embodiment, second adsorbent chamber 42 is thermally coupled to a fan 78 configured to cool second adsorbent chamber 42 following the desorbing or recharging mode and prior and/or during an adsorbing or cooling mode. In one embodiment, first and second heaters 68, 70 are powered by a fuel source 86. Fuel source 86 may include any desirable fuel including natural gas, diesel, liquefied petroleum, heating oil, jet propellant, liquid propane, solar energy, geothermal energy and/or a battery. In one embodiment, an additional heat source 82, such as the exhaust from a combustion engine (e.g., the combustion engine of a vehicle using cooling system 100) or other waste heat, may be thermally coupled to one or more of the first and second adsorbent chambers 40, 42 in the recharging modes and discussed further below. In some embodiments, a single fan is provided to cool first and second adsorbent chambers 40, 42. In some embodiments, a single heater is provided to heat first and second adsorbent chambers 40, 42.

In one embodiment, refrigerant 12 is moved within cooling system 100 only as a result of the adsorption in and desorption from adsorbent 18. In one embodiment, controlling one or more valves 62, 64, 66, 90, 92, 94 and heaters 68, 70, 82 moves refrigerant 12 through cooling system 100 without the assistance of one or more pumps. In other embodiments, one or more pumps are provided to assist with moving refrigerant 12 within cooling system 100.

In one embodiment, cooling system 100 includes a control system 84. In one embodiment, control system 100 includes one or more computers having one or more processors and memory (e.g., one or more nonvolatile or volatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

In one embodiment, control system 100 is electronically coupled to and configured to control the operation of one or more valves 62, 64, 66, 90, 92, 94 to control the fluid coupling between various components of cooling system 100. In one embodiment, control system 100 is electronically coupled to and configured to control the operation of one or more fans 54, 74, 76, 78 to cool various components of cooling system 100. In one embodiment, control system 84 is electronically coupled to and configured to control the operation of heaters 68, 70, 82. In one embodiment, control system 84 is powered by a power source 88. In one embodiment, power source 88 is a battery. In one embodiment, power source 88 is powered by fuel source 86. In one embodiment, power source 88 is a thermoelectric generator.

In one embodiment, control system 100 is programmed to control the adsorption and desorption of refrigerant 12 of the adsorbent chambers 40, 42 and alternate adsorbent chambers 40, 42 between the cooling modes and recharging modes to maintain substantially continuous adsorption of vaporized refrigerant 46 from the evaporator 48 during a cooling cycle. In one embodiment, at the end of the cooling cycle control system 100 is programmed to cease desorption of refrigerant 80 from adsorbent chambers 40, 42, allow adsorption of vaporized refrigerant 46 from evaporator 48 and at the end of the adsorption cycle continue to maintain the at least two adsorbent chambers in an adsorbed state in a storage mode.

Figure 4:
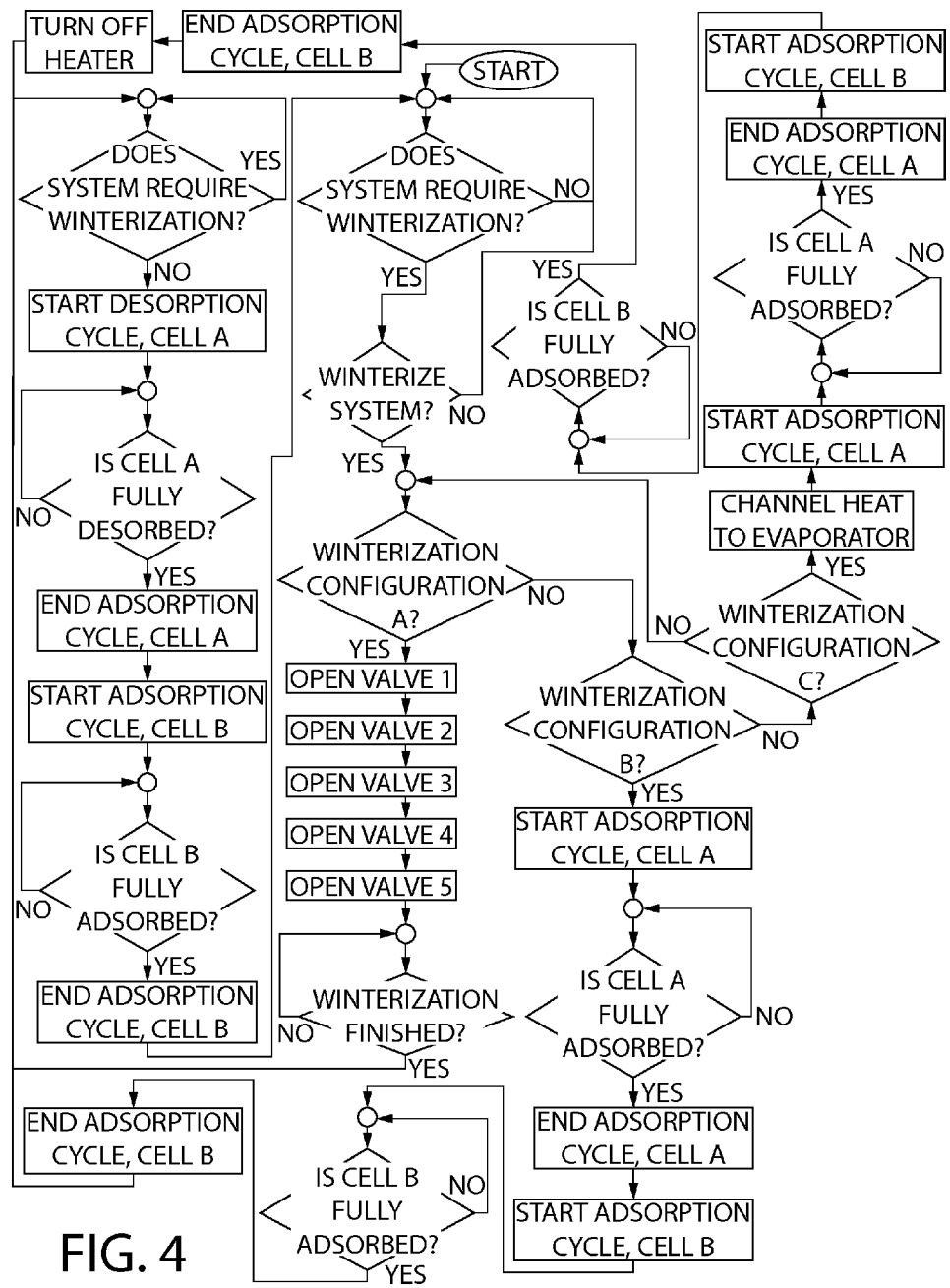
FIG. 4 is a flow chart of the operation of a cooling system in accordance with an exemplary embodiment of the present invention.

Cooling system 100 may be entered into the storage mode in a variety of ways. FIG. 4 is a flow chart outlining three exemplary methods. Referring to FIG. 4, the "winterization configuration a" may be achieved by opening valves 1-5 corresponding to valves 62, 64, 66, 90, 92 shown in FIG. 3. The "winterization configuration b" may be achieved by fully adsorbing cell a, corresponding to first adsorbent chamber 40 in FIG. 3 and then subsequently fully adsorbing cell b, corresponding to second adsorbent chamber 42 shown in FIG. 3. The "winterization configuration c" may be achieved by the same method as winterization configuration b with the addition of applying additional heat to evaporator 48 to accelerate adsorption.

Figure 6:
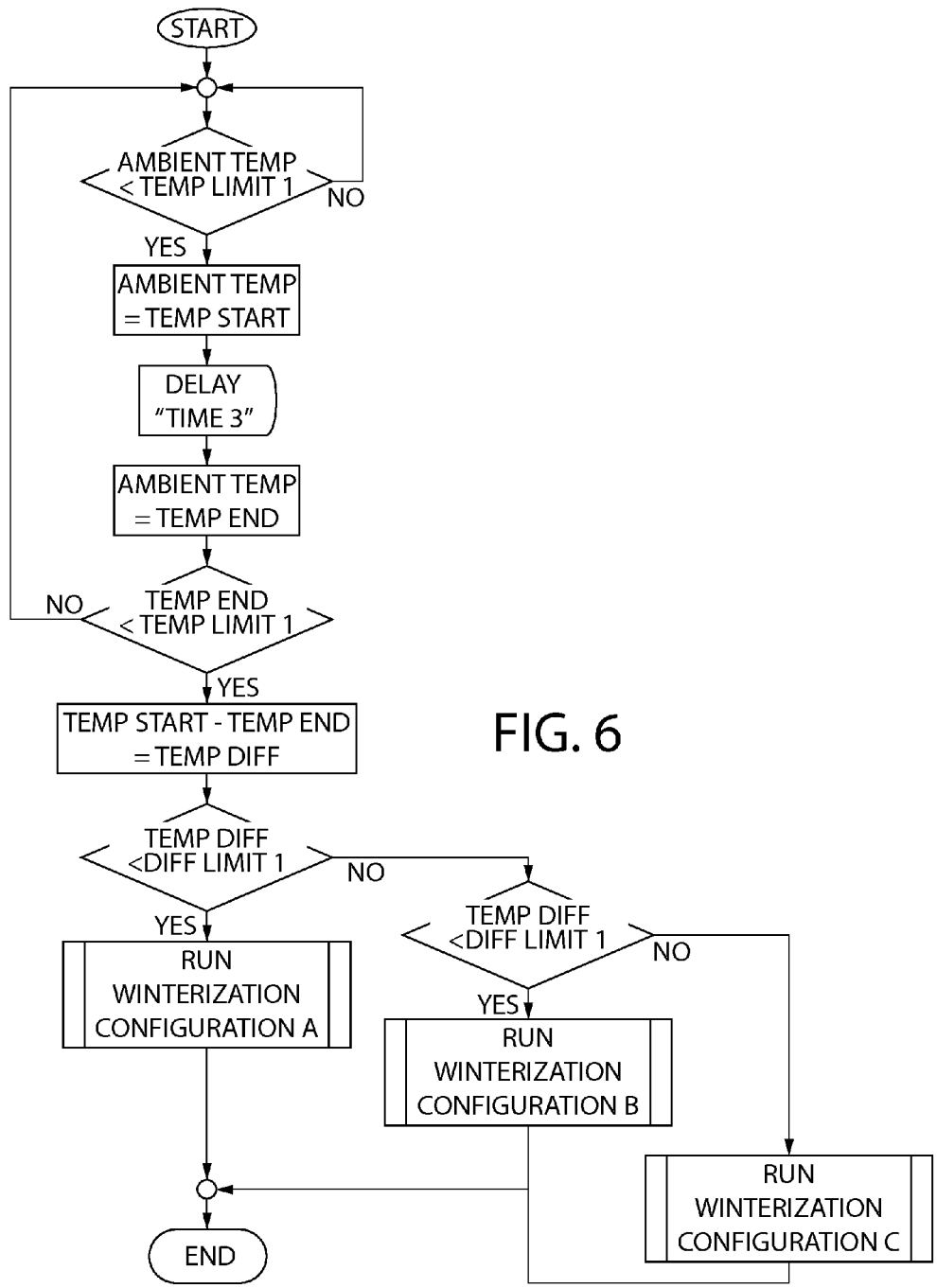
FIG. 6 is a flow chart of the operation of a cooling system in accordance with an exemplary embodiment of the present invention.

Certain storage configurations may be faster than others but may use more energy. Control system 84 and/or a user may therefore decide which storage configuration is optimal to use for a given situation. Referring to FIG. 6, for example, control system 84 may automatically enter into one of a plurality of storage configurations based on how quickly the ambient temperature is changing. In one embodiment, control system 84 monitors the ambient temperature (e.g., using sensor 96 or receive information from a weather report). When the ambient temperature falls below a predetermined limit, control system 84 will record that current temperature. After a predetermined delay, control system 84 will record what the ambient temperature changes to and compare what the difference is to the initial recorded temperature. Control system 84 will then decide, based on how quickly the temperature changed, which winterization configuration is the most optimal to use. For example, if the temperature is dropping slowly (e.g., less than a predetermined value ("limit 1" in FIG. 6)) then control system 84 may utilize "winterization configuration a" by opening valves 1-5 corresponding to valves 62, 64, 66, 90, 92 shown in FIG. 3. If the temperature is dropping more quickly (e.g., greater than a first predetermined value ("limit 1" in FIG. 6) and less than a second predetermined value ("limit 2" in FIG. 6)) then control system 84 may utilize "winterization configuration b" by fully adsorbing cell a, corresponding to first adsorbent chamber 40 in FIG. 3 and then subsequently fully adsorbing cell b, corresponding to second adsorbent chamber 42 shown in FIG. 3. If the temperature is dropping even more quickly (e.g., more than a predetermined value ("limit 2" in FIG. 6)) then control system 84 may utilize "winterization configuration c" by the same method as winterization configuration b with the addition of applying additional heat to evaporator 48 to accelerate adsorption.

In certain embodiments, the user of cooling system 100 selects (e.g., from a control panel or other control such as a cellular phone) certain commands for control system 84 to execute. For example, user selects or programs when the cooling cycle should start, when the cooling cycle should end, whether to automatically recharge cooling system 100 when waste heat is available, and/or whether or not to enter the storage mode at the end of the cooling cycle.

Control system 84 may be programmed to automatically enter the storage mode. In one embodiment, control system 84 is programmed to enter the storage mode at the end of the cooling cycle. In one embodiment, control system 84 is programmed to enter the storage mode at the end of the cooling cycle unless the user selects otherwise. In one embodiment, control system 84 is programmed to enter the storage mode at a predetermined time (e.g., at 6:00 am or on October 1st) or as a result of a predetermined condition (e.g., the engine of the vehicle has been off for over 12 hours or cooling system 100 has not been used for two weeks), or at the end of each cooling cycle.

In one embodiment, control system 84 includes a sensor 96. In one embodiment, sensor 96 is a temperature sensor. In one embodiment, sensor 96 is a global positioning system (GPS). In one embodiment, sensor 96 is a pressure sensor. In one embodiment, sensor 96 is an altimeter. In one embodiment, control system 84 automatically enters cooling system 100 into the storage mode when sensor 96 senses a predetermined ambient air temperature, air pressure, altitude and/or geographic location. For example, between cooling cycles if temperature sensor 96 senses a predetermined ambient air temperature (e.g., 10° Celsius), control system 84 could open valves 64, 66 and/or apply heat to evaporator 48 such that substantially all of refrigerant 12 is adsorbed in adsorbent chambers 40, 42. In one embodiment, control system 84 is programmed to automatically recharge cooling system 100 and desorb refrigerant 12 from at least one adsorbent chamber 40, 42 when temperature sensor 96 senses a predetermined ambient air temperature. For example, when cooling system 100 is in the storage mode and the temperature sensor 96 senses a predetermined ambient air temperature (e.g., 15° Celsius), control system 84 cause one or more heaters 68, 70, 82 to apply heat to one or more adsorbent chambers 40, 42 so that cooling system 100 is recharged and ready for a subsequent cooling cycle.

In one embodiment, control system 84 is programmed to automatically enter cooling system 100 into the storage mode based on actual or forecasted weather conditions. For example, the control system 84 may receive input from a weather report and if the temperature is or forecasted to be near or below a predetermined temperature value, control system 84 enters cooling system 100 into the storage mode following use of cooling system 100, or if not in use, automatically enter cooling system 100 into the storage mode at a predetermined time.

In one embodiment, control system 84 enters cooling system 100 into the storage mode by opening one or more valves 64, 66. In one embodiment, eventually substantially all of refrigerant 12 is adsorbed into adsorbent chambers 40, 42 even if heat transfer medium pump 50 is off. In one embodiment, control system 84 enters cooling system 100 into the storage mode by keeping the adsorbent chambers 40, 42 adsorbed at the end of the cooling cycle. In one embodiment, the cooling system 100 is run through a standard adsorption cycle, using heat from space 52 to heat heat transfer medium 44 and speed up the evaporation in the evaporator 48 and therefore speed up adsorption of refrigerant 12 into adsorbent chambers 40, 42. In such an embodiment, the recharging mechanism, the heaters 68, 70, 82 would be disengaged so that when each adsorbent chamber 40, 42 is fully adsorbed, cooling system 100 would not go into a desorbing mode. Cooling system 100 would remain the storage mode until one or more heaters 68, 70, 82 were used to desorb water from adsorbent chambers 40, 42 to recharge cooling system 100.

In one embodiment, control system 84 enters cooling system 100 into the storage mode by applying additional heat to evaporator 48. Additional heat could be applied to evaporator 48 by one or more of heaters 68, 70 used for recharging adsorbent chambers 40, 42 or additional heat source 82 such as heat from a truck engine or other waste heat.

In one embodiment, control system 84 is coupled to a remote control, such a device connected to control system 84 through a wireless communication system or through the internet, so that a user can input commands remotely (e.g., using a smart phone). In other embodiments, the control system 84 is hard wired to a remote controlled device. In some embodiments, the user can adjust the operating and programmed parameters using a remote controlled device. In one embodiment, actual ambient conditions or weather forecasts can be presented to the user (e.g., using an application or app) and the user can select or program commands for entering cooling system 100 into a storage mode. For example, an app can alert the user via an app on the user's smart phone that "the temperature in Pittsburgh (current location) is predicted to be below freezing overnight. Do you want to enter the storage mode at the end of the cooling cycle?". The user may be driving with the cooling system 100 to a warmer climate where temperatures are predicted to be well above freeze and my therefore select "no" in response to the question.

In one embodiment, control system 84 is programmed to use additional heat source 82 to exit the storage mode and desorb refrigerant from at least one adsorbent chamber 40, 42. In one embodiment, control system 84 is programmed to use additional heat source 82 to desorb refrigerant from at least one adsorbent chamber 40, 42 regardless of whether cooling system 100 is in the storage mode. For example, after a cooling cycle, cooling system 100 is stopped with one or both adsorbent chambers 40, 42 in at least partially adsorbed state. Between cooling cycles, waste heat from additional heat source 82 may be available (e.g., the driver is done sleeping in space 52, cooling system 100 is off, and driver begins driving his truck creating heat from the exhaust of the engine). The heat from additional heat source 82 may be used to desorb refrigerant from one or both adsorbent chambers 40, 42 to rest cooling system 100 for a subsequent cooling cycle and saving fuel from fuel source 86. In some embodiments, the use of additional heat source 82 to desorb one or more adsorbent chambers 40, 42 between cooling cycles may be turned off, either automatically or selectively, if cooling system 100 is to remain in the storage mode. In other embodiment, waste energy (e.g., energy captured from braking of a vehicle) may be used to at least partially recharge fuel and/or energy sources 86, 88.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

We claim:

1. A cooling system comprising:
at least one evaporator containing a refrigerant;
at least two adsorbent chambers fluidly coupled to the at least one evaporator and each containing adsorbent configured to provide adsorption of vaporized refrigerant from the at least one evaporator in a cooling mode and configured to provide desorption of the refrigerant from the at least two adsorbent chambers to the at least one evaporator in a recharging mode; and
a control system configured to control the adsorption and desorption of the refrigerant of the at least two adsorbent chambers, the control system being programmed to alternate the at least two adsorbent chambers between the cooling modes and recharging modes to maintain adsorption of the vaporized refrigerant from the at least one evaporator during a cooling cycle,
wherein at the end of the cooling cycle the control system is programmed to cease desorption of the refrigerant from the at least two adsorbent chambers, allow adsorption of the vaporized refrigerant from the at least one evaporator and at the end of the adsorption cycle continue to maintain the at least two adsorbent chambers in an adsorbed state in a storage mode.

2. The cooling system of claim 1 further comprising:
a plurality of valves disposed between the at least one evaporator and the at least two adsorbent chambers, the plurality of valves being controlled by the control system.

3. The cooling system of claim 2, wherein the control system is programmed to open the plurality of valves in the storage mode.

4. The cooling system of claim 1 further comprising:
a condenser fluidly coupled to the at least two adsorbent chambers; and
a water reservoir fluidly coupled between the condenser and the at least one evaporator,
wherein the at least one evaporator includes a single evaporator.

5. The cooling system of claim 1, wherein the refrigerant is water.

6. The cooling system of claim 1, wherein the adsorbent is zeolite.

7. The cooling system of claim 1, wherein the adsorbent is a material having a metal organic framework.

8. The cooling system of claim 1, wherein the control system automatically enters the storage mode at the end of the cooling cycle.

9. The cooling system of claim 1 further comprising:
an ambient air temperature sensor, wherein the control system is programmed to automatically enter the storage mode when the temperature sensor senses a predetermined ambient air temperature.

10. The cooling system of claim 9, wherein the control system is programmed to automatically enter into the recharging mode when the ambient air reaches a second predetermined ambient air temperature.

11. The cooling system of claim 1, wherein the control system is capable of being remotely programmable to enter the storage mode.

12. The cooling system of claim 1 further comprising:
at least one heat exchanger thermally coupled to the at least one evaporator and configured to exchange heat between a heat transfer medium and the at least one evaporator.

13. The cooling system of any of claim 1 further comprising:
at least one energy source thermally coupled to the at least two adsorbent chambers and configured to heat the at least two adsorbent chambers during the recharging mode.

14. The cooling system of claim 13, wherein the at least one energy source includes exhaust from an engine of a vehicle.

15. The cooling system of claim 14, wherein the at least one energy source includes at least one heater, each heater thermally coupled to at least one of the at least two adsorbent chambers, the control system using the at least one heater to heat the at least two adsorbent chambers during the recharging mode of the cooling cycle, the control system at least partially using the heat from the engine exhaust to heat the at least two adsorbent chambers causing desorption of the refrigerant from the adsorbent.

16. The cooling system of any of claim 1, wherein the refrigerant is adsorbed within the adsorbent in the storage mode.

17. The cooling system of claim 1, wherein a volume of the refrigerant is equal to or less than a total adsorption capacity of the adsorbent.

18. The cooling system of claim 1, wherein the evaporator includes a thermally conductive liner.

19. The cooling system of claim 1, further comprising a valve to feed the refrigerant into the evaporator at the same rate the refrigerant is leaving the evaporator.

20. The cooling system of claim 1, further comprising a valve to feed the refrigerant into the evaporator at a rate to allow the evaporator to go to a temperature lower than the freezing temperature of the refrigerant.

\* \* \* \* \*